United States Patent
Mo

(10) Patent No.: US 10,963,244 B2
(45) Date of Patent: Mar. 30, 2021

(54) COMMIT REVERSION DETECTION

(71) Applicant: MICROSOFT TECHNOLOGY LICENSING, LLC, Redmond, WA (US)

(72) Inventor: Man Yue Mo, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 168 days.

(21) Appl. No.: 16/229,900

(22) Filed: Dec. 21, 2018

(65) Prior Publication Data

US 2019/0205127 A1 Jul. 4, 2019

Related U.S. Application Data

(60) Provisional application No. 62/611,804, filed on Dec. 29, 2017.

(51) Int. Cl.
G06F 8/77 (2018.01)
G06F 8/75 (2018.01)
G06F 8/71 (2018.01)

(52) U.S. Cl.
CPC .............. *G06F 8/77* (2013.01); *G06F 8/71* (2013.01); *G06F 8/75* (2013.01)

(58) Field of Classification Search
None
See application file for complete search history.

(56) References Cited

U.S. PATENT DOCUMENTS

| 5,497,487 A | 3/1996 | Fortier | |
|---|---|---|---|
| 7,810,069 B2 * | 10/2010 | Charisius | G06F 8/36 717/110 |
| 8,418,141 B2 * | 4/2013 | Baeumer | G06F 8/71 717/122 |
| 8,495,100 B2 * | 7/2013 | Cheung | G06F 8/71 707/794 |

(Continued)

FOREIGN PATENT DOCUMENTS

| WO | WO-2007041242 A2 * | 4/2007 | G06F 8/71 |
| WO | WO-2007041242 A3 * | 2/2008 | G06F 8/71 |

OTHER PUBLICATIONS

Pilato, C. Michael, Ben Collins-Sussman, and Brian W. Fitzpatrick. Version control with subversion: next generation open source version control. "O'Reilly Media, Inc.", 2008. (Year: 2008).*

(Continued)

*Primary Examiner* — Matthew J Brophy
(74) *Attorney, Agent, or Firm* — Workman Nydegger

(57) ABSTRACT

Methods, systems, and apparatus, including computer programs encoded on computer storage media, for discounting source code contributions occurring in reverted commits. One of the methods includes identifying, in a time-ordered sequence of commits, one or more matching sequences of additions and deletions of the files which have the same file path, comprising. A value for a contribution metric is computed for a responsible developer entity including discounting portions of the metric resulting from additions and deletions in any of the identified matching sequence of additions and deletions for the files having the same file path.

20 Claims, 3 Drawing Sheets

(56) References Cited

U.S. PATENT DOCUMENTS

| | | | |
|---|---|---|---|
| 8,589,859 B2* | 11/2013 | Kaulgud | G06F 11/3616 717/101 |
| 8,990,764 B2* | 3/2015 | Armstrong | G06F 8/71 717/101 |
| 9,311,056 B2* | 4/2016 | Armstrong | G06F 8/71 |
| 9,411,578 B2* | 8/2016 | Henriksen | G06F 8/71 |
| 9,411,579 B2* | 8/2016 | Henriksen | G06F 16/148 |
| 9,639,352 B1* | 5/2017 | van Schaik | G06F 8/77 |
| 9,639,353 B1* | 5/2017 | Henriksen | G06F 9/451 |
| 9,766,884 B1* | 9/2017 | Henriksen | G06F 11/36 |
| 9,785,421 B1* | 10/2017 | Neatherway | G06F 8/77 |
| 9,785,432 B1* | 10/2017 | Wright | G06Q 10/06398 |
| 9,898,604 B2 | 2/2018 | Fang et al. | |
| 10,248,416 B2* | 4/2019 | Jha | G06F 8/10 |
| 10,310,853 B2* | 6/2019 | Wright | G06F 8/77 |
| 10,430,184 B2* | 10/2019 | Neatherway | G06F 8/75 |
| 10,438,170 B2* | 10/2019 | Kozloski | G06Q 10/101 |
| 10,467,004 B2* | 11/2019 | Neatherway | G06F 8/71 |
| 2002/0016954 A1* | 2/2002 | Charisius | G06F 9/44 717/106 |
| 2006/0150168 A1 | 7/2006 | Mitchell et al. | |
| 2009/0070734 A1* | 3/2009 | Dixon | G06F 8/71 717/102 |
| 2011/0055799 A1* | 3/2011 | Kaulgud | G06F 11/3616 717/101 |
| 2012/0036492 A1* | 2/2012 | Armstrong | G06F 8/71 717/100 |
| 2012/0216172 A1* | 8/2012 | Armstrong | G06F 8/71 717/101 |
| 2012/0240096 A1* | 9/2012 | Sass | |
| 2015/0235282 A1* | 8/2015 | Kamath | G06Q 30/0283 717/102 |
| 2016/0140015 A1* | 5/2016 | Baars | G06F 11/3604 717/132 |
| 2016/0162289 A1* | 6/2016 | Henriksen | G06F 11/3604 717/123 |
| 2016/0162388 A1* | 6/2016 | Henriksen | G06F 8/433 717/124 |
| 2017/0235664 A1* | 8/2017 | Henriksen | G06F 11/3616 717/122 |
| 2017/0269909 A1* | 9/2017 | Smith | G06F 8/34 |
| 2018/0189732 A1* | 7/2018 | Kozloski | G06F 8/71 |
| 2018/0239898 A1* | 8/2018 | Haerterich | G06F 8/71 |
| 2018/0285103 A1* | 10/2018 | Jha | G06F 8/10 |
| 2018/0300127 A1* | 10/2018 | Wright | G06F 8/77 |
| 2019/0050814 A1* | 2/2019 | Surkov | G06T 11/20 |
| 2019/0121636 A1* | 4/2019 | Neatherway | G06F 8/77 |
| 2019/0205126 A1* | 7/2019 | Neatherway | G06F 8/77 |

OTHER PUBLICATIONS

Faragó, Csaba, Péter Hegedűs, and Rudolf Ferenc. "Cumulative code churn: Impact on maintainability." 2015 IEEE 15th International Working Conference on Source Code Analysis and Manipulation (SCAM). IEEE, 2015. (Year: 2015).*

Meneely, Andrew, et al. "When a patch goes bad: Exploring the properties of vulnerability-contributing commits." 2013 ACM/IEEE International Symposium on Empirical Software Engineering and Measurement. IEEE, 2013. (Year: 2013).*

\* cited by examiner

COMMIT REVERSION DETECTION

CROSS-REFERENCE TO RELATED APPLICATION

This application claims benefit of priority to U.S. Application No. 62/611,804, filed Dec. 29, 2017, the entire contents of which are hereby incorporated by reference.

BACKGROUND

This specification relates to static analysis of software source code.

Static analysis refers to techniques for analyzing computer software source code without executing the source code as a computer software program. Static analysis systems analyze source code to determine various properties about source code in a code base.

SUMMARY

This specification describes how a static analysis system can determine likely commit reversions in order to generate more accurate metrics related to source code development. The metrics can measure the source code between two snapshots and measure changes to the code between the snapshots. Reversions can be excluded from these metrics to improve the usefulness of the metrics.

Particular embodiments of the subject matter described in this specification can be implemented so as to realize one or more of the following advantages. By excluding partial and full reversions from source code metrics, the usefulness of source code metrics can be improved. For example, erroneous and reversed file operations can be excluded from source code metrics in order to present a more useful measure of human effort. These metrics can reflect features of source code in a way that is less noisy and less confusion. The metrics may be treated as more trustworthy, in part due to the fact that it focuses on changes in source code that are of actual interest to the developers of the code.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a static analysis system can be used to measure the effort put into developing source code. In general, effort is applied to the source code when source code is created, modified, or deleted. This effort can be captured in metrics to allow source code developers to better understand their work.

However, some operations on the source code do not represent effort, and metrics can be improved by removing these operations. Some of these operations that can be removed are called reversions. Reversions can include instances in which a file or an edit are reverted without lasting impact. For example, if a developer accidently saves a temporary file in the wrong directory and commits the file to source control, then later corrects the error by deleting the file, this error may not be useful to include in a metric measuring the growth of the source code. As such, events such as this reversion may be excluded or removed from source code metrics.

Figure 1:
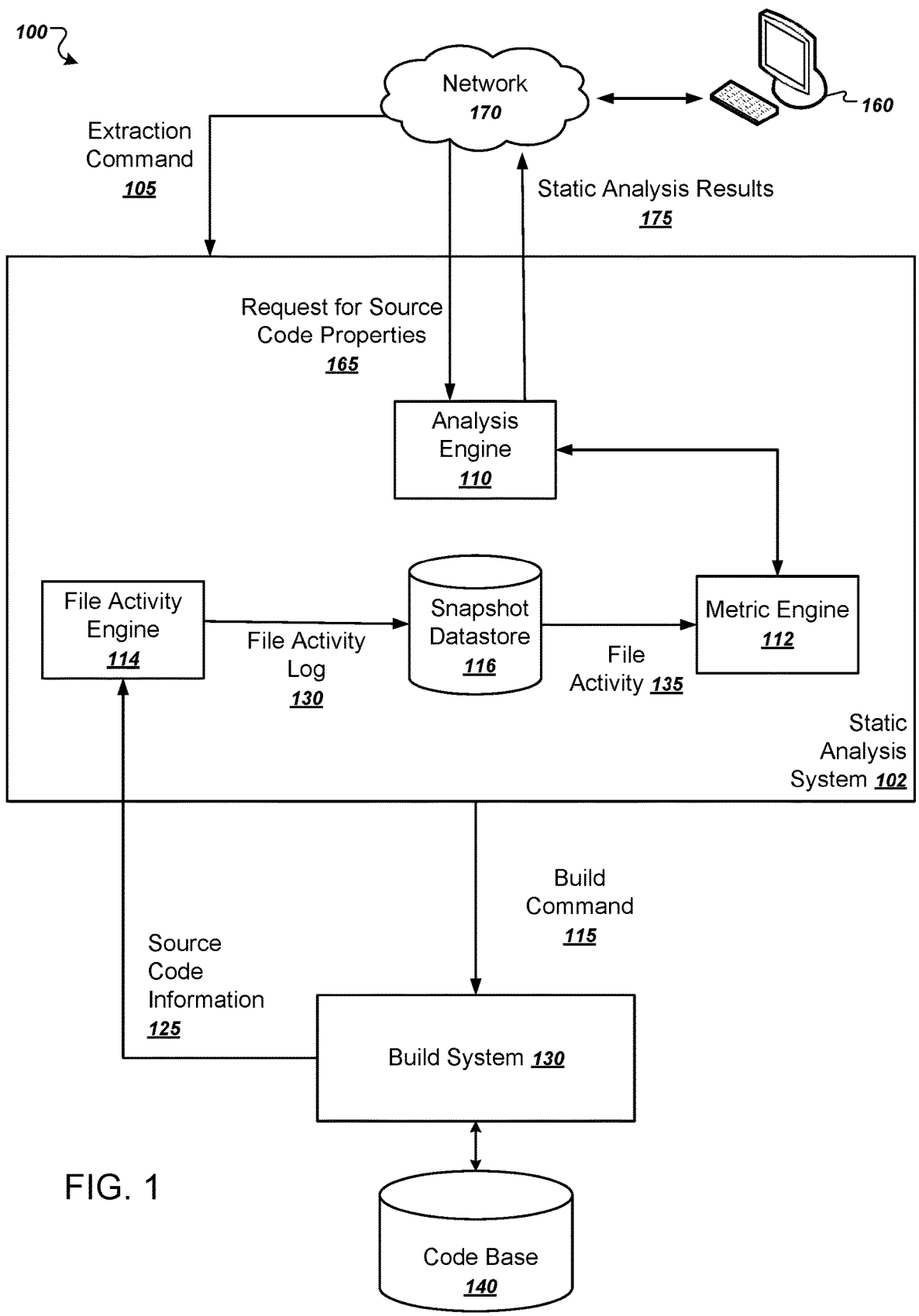
FIG. 1 is a diagram of an example system.

FIG. 1 is a diagram of an example system 100. The system 100 includes a user device 160 in communication with a static analysis system 102 over a network 170, which can be any appropriate communications network. The system 100 is an example of a system in which a static analysis system 102 examines unreverted files in a code base 140 to generate metrics reflective of the effort used to develop the code base 140.

The static analysis system includes an analysis engine 110 and a metric engine 112, a file activity engine 114, and a snapshot datastore 116. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 is in communication with a build system 130. The build system 130 can be installed on a single computer or on multiple computers. The static analysis system 102 and the build system 130 can be installed on different computing devices that are in communication with one another, e.g., using the network 170, or the static analysis system 102 and the build system 130 can be installed on a same computing device.

The build system 130 operates on source code in a code base 140. The build system 130 can include compilers that compile the source code, or the build system can be a system that does not compile source code. For example, the code base 140 can include interpreted languages such as Python or JavaScript that do not use a compiler at all.

In operation, the user device 160 provides an extraction command 105 to the static analysis system 102. The extraction command 105 is a request for the static analysis system 102 to extract source code that is processed by the build system 130. In some implementations, the static analysis system 102 causes the build system 130 to initiate a build of source code in the code base 140. For example, the static analysis system can provide a build command 115 to the build system 130 to initiate a build.

The file activity engine 114 can store the file activity logs 130 in a snapshot datastore 116. The snapshot datastore 116 may store data from the file activity logs 130 in a format conducive to searching for information about the source code at particular snapshots. A snapshot is generally a representation of the source code at a particular point in time. For example, the snapshot may include a listing of all files in the source code as it existed at, for example, January 1 at 12:00 noon and another snapshot may include a listing of all files in the source code at, for example, January 14 at 12:00 noon. This listing may include, for example, the file names of each file, an indication of the project or package it is associated with, and if the source code contains multiple branches, any branching information.

The metric engine 112 can generate metrics related to the source code by accessing a listing of the file activity 135 from the source code. From the file activity 135, the metric engine 112 can generate a list of unreverted files. In general, the unreverted files include a listing of files that are in the code base that were present in a first and second snapshot as well as any files that were modified. By excluding, for example, files that added and removed without being edited, the metrics generated by the metric engine 112 can avoid including information about files that a developer may not be interested in. For example, if compiling the source code creates temporary files that are shortly thereafter deleted, excluding those temporary files from the collection of unreverted files can allow the metric engine 112 to generate metrics that are more reflective of the human effort that goes into development of the source code.

To provide static analysis results 175, the system 102 receives, from the user device 160, a request for source code properties 165 of a portion of the code base 140. An analysis engine 110 receives the request 165 and uses one or more static analyzers to analyze the unreverted files stored in the snapshot datastore 116 in order to generate static analysis results 175.

The analysis engine 110 then provides the static analysis results 175 back to the user device 160, where the user device 160 presents the results 175 to a user. For example, the static analysis results can be presented as part of an integrated development environment (IDE) or in a command line environment. The static analysis results 175 can identify the amount of churn, added lines, or net violations in the source code files of the code base 140, e.g., the number of files added, deleted, or modified; a count of lines added in all files; and where in the code base the violation occurs, as well as an error message explaining why the snippet of code is considered to be a violation; respectively.

Figure 2:
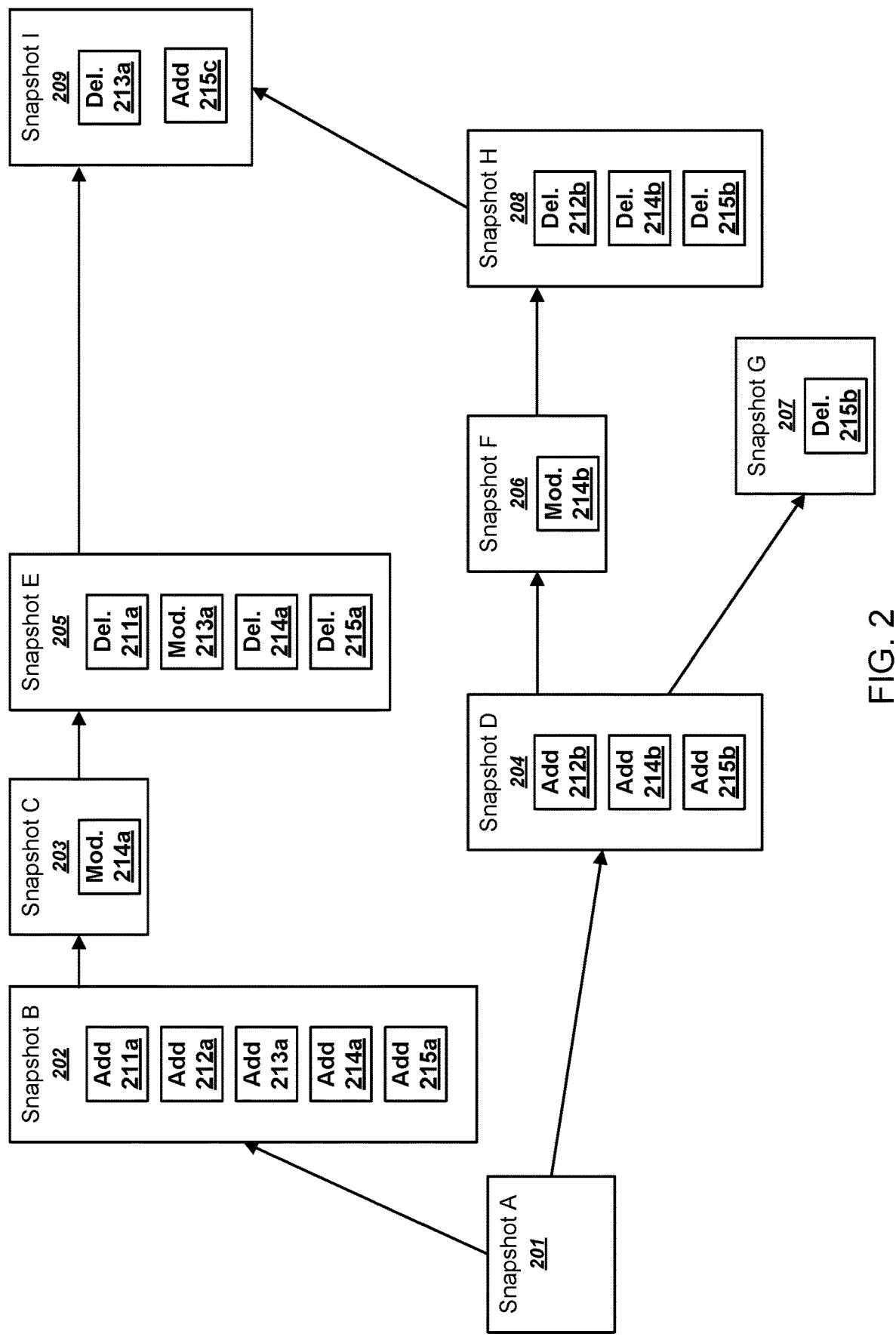
FIG. 2 is a block diagram of an example code base at various snapshots in time.

FIG. 2 is a block diagram of an example code base that is modified over time and captured in a group of snapshots 200-209. As described, the snapshots 200-209 can be generated from file activity logs generated by the software development process. The snapshots 200-209 can represent the source code without including the source code itself. For example, each of the snapshots 200-209 can take the form of a structured data object such as a JSON object or a file organized according to the Extensible Markup Language (.xml) format.

In the snapshot 201, the earliest of the snapshots 200-209, a package exists in the code base. The package includes files such as source code files, resources (e.g., media files), and metadata files that store data about the project. Each of the later snapshots 202-209 record the package as it is being developed. These development activities include adding new files, deleting existing files, and changing existing files.

The snapshot 202 reflects the source code at a later point in time, after some development has taken place. In the snapshot 202, files 211a-215a have been added to the package. Later, working from snapshot 202, snapshot 203 is made when file 214a is modified. Snapshot 205 is made from snapshot 203, with file 211a deleted, file 213a modified, 214a deleted, and file 215a deleted.

The snapshot 201 has been forked to create the snapshot 204. In the snapshot 204, the snapshot 201 is updated with the adding of files 212b, 214b, and 215b. For clarity, files having the same file paths but in different branches are identified with different letters. For example, file 211a added to snapshot 202 and file 212b added to snapshot 204 may have the same file path but different contents.

The snapshots 201-209 are shown arranged in the form of a revision graph that depicts the revision history of the package. In this example, snapshot 204 has been forked again into a snapshot 206, which modifies 204b; and into a snapshot 207, which deletes file 215b. Two of the branches are merged, when snapshot 205 and 208 merge into snapshot 209. In snapshot 209, file 213a has been deleted and file 215c has been added.

The snapshots 201-209 are labeled in chronological order of their creations, regardless of the forking and merging. In this example, snapshot 201 is created, then the next snapshot created is snapshot 202, then the next snapshot created is 203, then the next snapshot created is 204, etc.

The snapshots 200-209 demonstrate file operations that may lead to files 211-215 being included or excluded when computing metrics that measure software development effort.

As described above, file 211 is added in snapshot 202 and then deleted in snapshot 205. This may be the result of, for instance, a file that was created by accident and not noticed until snapshot 205. In such an instance, including information about the file 211 in a metric may be misleading because the person who introduced the file 211 and then deleted it may get churn credit for adding the file and even more churn credit for deleting the file. This is misleading because it does not accurately represent changes that had an actual impact on the code base. Therefore, in some situations, a system can compute metrics by excluding both the addition of and the deletion of the file 211.

The file 212 undergoes the following series of operations: Add in the snapshot 202, Add in the snapshot 204, Delete in the snapshot 208. In this case, the same file was added twice and then deleted. Thus, when the branches are merged in the snapshot 209, all activity related to the file 212 is absent. Therefore, the system can compute productivity metrics by excluding both adds and the delete for the file 212.

The file 213 undergoes the following series of operations: Add in 202, Change in 205, Delete in 209. For example, this may result from a situation in which a developer creates a file 213a in the snapshot 202, later modifies 213a the file in the snapshot 205, and finally decides to delete the file 213a in the snapshot 209. In this instance, the system can consider the add in 202 and the delete in the snapshot 209 to cancel each other out, which leaves just the modification in 205 to be counted in the productivity metrics.

The file 214 undergoes the following series of operations: Add in 202, Change in 203, Add in 204, Delete in 205, Change in 206, and Delete in 208. In this instance, the system can consider all the adds and deletes of the file 214 to cancel each other out, leaving just the changes in 203 and in 206 to be included in the productivity metrics.

The file 215 undergoes the following series of operations: Add in 202, Add in 204, Deleted in 205, Deleted in 207, Deleted in 208. In this instance, the system can consider all the adds and deletes to cancel each other out. Thus, the system can exclude both additions and all three deletions when computing productivity metrics for the file 215.

Various metrics may be applied to the included files. For example, a measure called "churn" may measure the amount of change in a code base. This metric may tally the number of additions, deletions, and changes between snapshots. Another metric called added lines may count the number of additions and subtract the number of deletions. Another metric is called net violations. This metric may measure a number of coding-standards violations introduced between the two snapshots. Other metrics are possible. Each or all of these metrics can be calculated using only the included files.

Figure 3:
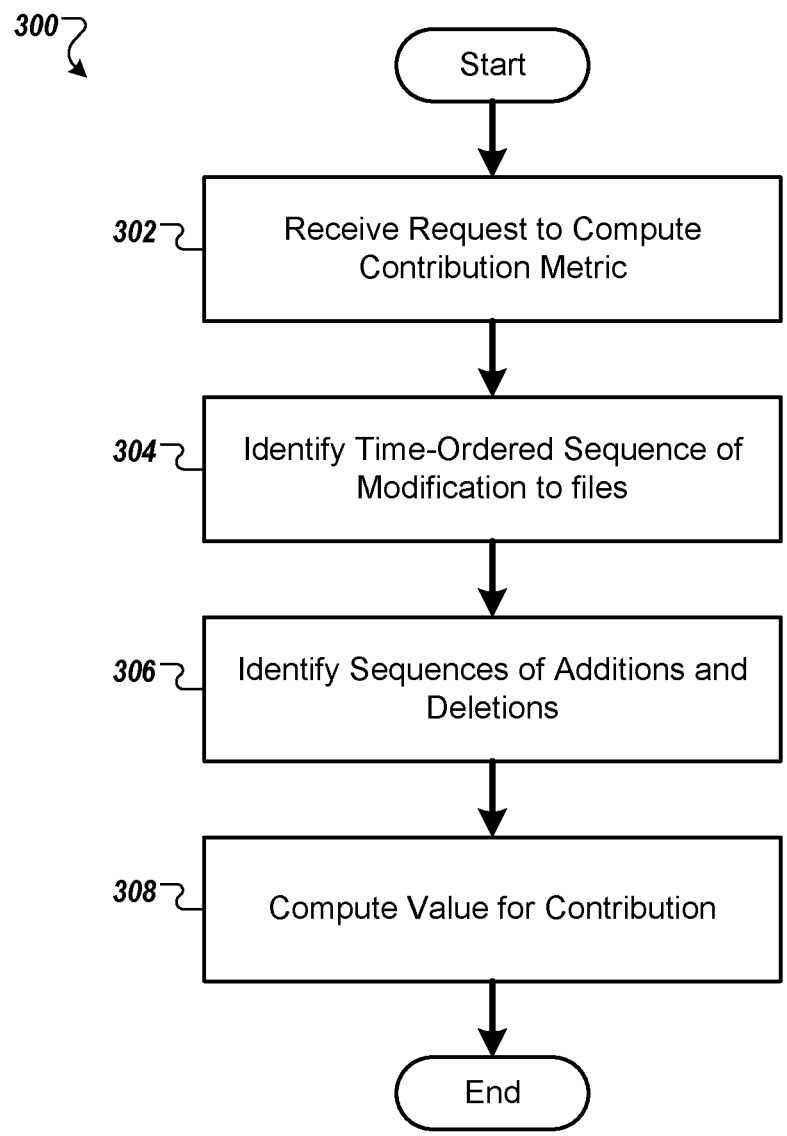
FIG. 3 is a flow chart of an example process for generating metrics Like reference numbers and designations in the various drawings indicate like elements.

FIG. 3 is a flow chart of an example process 300 for generating metrics. The process 500 will be described as being performed by an appropriately programmed system of one or more computers. For example, the system 100, appropriately programmed, can perform the process 300.

However, another system or systems may be used to perform the process 300 or a similar process.

The system receives a request to compute a value of a contribution metric for modifications to a plurality of snapshots of a software project committed by a developer entity (302). For example, the user device 160 may send an extraction command 105 to the static analysis system 102, and in the extraction command 105 may be a request for one or more metrics related to the effort used to develop a project in the code base 140.

A developer entity can be a single developer or a group of multiple developers. For example, a developer entity can be developers on a team, developers within a department of an organization, or any other appropriate group of developers.

The system determines a time-ordered sequence of modifications to files having a same file path in the project (304). For example, the metric engine 112 can select a series of snapshot in the snapshot datastore 116 and can order the snapshots according to the date they were each created, e.g., from earliest to latest.

The system identifies one or more matching sequences of additions and deletions of the files having the same file path (306). For example, the code base 140 may organize code by project, and within each project a namespace for files may be partitioned by file path, and the metric engine 112 can identify files with the same file path. The file path may include, for example, a directory path portion and a file name portion. The different snapshots, being from different forks, may have inconsistent file contents from one snapshot to the next in the chronological ordering. That is, files at a file path (e.g., .com.example.file.dat) may be inconsistent from in a chronological ordering of snapshots.

The identifying 306 includes identifying, for each matching sequence, a first sequence of operations followed by a second sequence of operations. The first sequence of operations comprises one or more additions and no intervening deletions. The second sequence of operations comprises one or more deletions and no intervening additions. That is to say, the matching sequence may include a first sequence that contains additions and other, non-deletion type, operations (e.g., modifications). The second sequence contains deletions and other, non-addition type, operations (e.g., modifications). If such a first sequence and second sequence are so identified, then all additions are identified as occurring before all deletions, within the matching sequences.

The identifying 306 includes ending the matching sequence at a first addition occurring after the second sequence or at a final modification in the time-ordered sequence of modifications. Here, this ending to the matching sequence is identified when there are, for example, not additions after the end of the second sequence, which contains only non-addition-type operations. By identifying 306 these conditions, the metric engine 112 can successfully identify partial reversions in the project.

To perform the identifying 306, the system can use one or more processes that include identifying additions and deletions. For example, the metric engine 112 can iterate through the sequence to identify additions and deletions in chronological order. To start, the metric engine 112 can operate in an "adding" state. For each addition found, the metric engine 112 can place the addition on an initially empty list of additions. Once the metric engine 112 finds a delete, the metric engine 112 can change to operate in a "deleting" state. Once in the deleting state, the metric engine 112 can continue to iterate through the sequence until a subsequent addition is found. The system can repeat this process for each sequence.

A value is computed 308 for a contribution metric for the developer entity. For example, using all of the files in the project, one or more metrics may be calculated. A churn metric, for example, may count the number of changed lines of code or characters in the files of the project.

Portions of the metric are discounted. Those portions are results of additions and deletions in any of the identified matching sequence of additions and deletions for the files having the same file path. For example, some of the files that have been marked for exclusion from the churn metric by the metric engine 112, based on meeting the previously described criteria. The churn count for those files may be discounted. In some cases, the discount is a complete removal. In some cases, the discount is a weighing of less than 1, resulting in a reduced but non-zero contribution to the churn metric.

For example, portions of the metric resulting from additions and deletions in any of the identified matching sequences of additions and deletions may be disregarded. For example, file 211 in FIG. 2 may be discounted from a metric calculated for the project of FIG. 2.

For example, discounting the portions of the metric may include scaling portions of the metric resulting from additions and deletions in any of the identified matching sequences of additions and deletions. This may be used, for example, in cases in which efforts put into a partial reversion is captured, but given less importance than effort that went into other portions of code base not subject to a partial reversion. This may be useful to account for the fact that a source code developer may gain better understanding of a project when making a partial reversion, even if no source code was ultimately contributed.

For example, a particular matching sequence of additions and deletions may have one or more intervening modifications to a file having the file path, and computing the value for the contribution metric for the developer entity comprises counting portions of the metric resulting from the intervening modifications to the file. For example, the modification of file 213 in FIG. 2 may be maintained in the metric, while the addition and deletion of the file 213 may be discounted.

For example, a particular matching sequence may include one addition and multiple deletions, and computing the value for the contribution metric comprises discounting the addition and all of the multiple deletions. For example, a particular file may be added to a project before a fork, and then deleted later from both forks. In such a case, the addition and the multiple deletions may all be discounted.

For example, a particular matching sequence may include multiple additions and one deletion, and wherein computing the value for the contribution metric comprises discounting all of the additions and the one deletion. For example, a particular file may be added in two different forks, maintained in the project through a merge, and then deleted later. In such a case, the additions and the deletion may all be discounted.

For example, a particular matching sequence may include a first number of additions and a different second number of deletions, and wherein computing the value for the contribution metric comprises discounting all of the first number of additions and all of the second number of deletions. For example, the additions and deletions of the file 215 FIG. 2 may be discounted.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving a request to compute a value of a contribution metric for modifications to a plurality of snapshots of a software project committed by a developer entity, wherein the developer entity comprises one or more source code developers;
identifying, from the plurality of snapshots, a time-ordered sequence of modifications to files having a same file path in the project, the modifications being attributed to the developer entity;
identifying, in the time-ordered sequence, one or more matching sequences of additions and deletions of the files which have the same file path, comprising:
identifying, for each matching sequence, a first sequence of operations followed by a second sequence of operations wherein the first sequence of operations comprises one or more additions no intervening deletions, and wherein the second sequence of operations comprises one or more deletions no intervening additions, and
ending the matching sequence at a first addition occurring after the second sequence or at a final modification in the time-ordered sequence of modifications; and
computing a value for a contribution metric for the developer entity including discounting portions of the metric resulting from additions and deletions in any of the identified matching sequence of additions and deletions for the files having the same file path.

Embodiment 2 is the method of embodiment 1, wherein discounting the portions of the metric comprises disregarding portions of the metric resulting from additions and deletions in any of the identified matching sequences of additions and deletions.

Embodiment 3 is the method of any one of embodiments 1-2, wherein discounting the portions of the metric comprises scaling portions of the metric resulting from additions and deletions in any of the identified matching sequences of additions and deletions.

Embodiment 4 is the method of embodiment 3, wherein a particular matching sequence of additions and deletions has one or more intervening modifications to a file having the file path, and
wherein computing the value for the contribution metric for the developer entity comprises counting portions of the metric resulting from the intervening modifications to the file.

Embodiment 5 is the method of any one of embodiments 1-4, wherein a particular matching sequence comprises one addition and multiple deletions, and wherein computing the value for the contribution metric comprises discounting the addition and all of the multiple deletions.

Embodiment 6 is the method of any one of embodiments 1-5, wherein a particular matching sequence comprises multiple additions and one deletion, and wherein computing the value for the contribution metric comprises discounting all of the additions and the one deletion.

Embodiment 7 is the method of any one of embodiments 1-6, wherein a particular matching sequence comprises a first number of additions and a different second number of deletions, and wherein computing the value for the contribution metric comprises discounting all of the first number of additions and all of the second number of deletions.

Embodiment 8 is the method of any one of embodiments 1-7, wherein the contribution metric is churn, added lines of code, deleted lines of code, added violations, deleted violations, net lines of code added, or net new violations.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system comprising:
one or more computers and one or more storage devices storing instructions that are operable, when executed by the one or more computers, to cause the one or more computers to perform operations comprising:
receiving a request to compute a value of a contribution metric for modifications to a plurality of snapshots of a software project committed by a developer entity, wherein the developer entity comprises one or more source code developers;

identifying, from the plurality of snapshots, a time-ordered sequence of modifications to files having a same file path in the project, the modifications being attributed to the developer entity;

identifying, in the time-ordered sequence, one or more matching sequences of additions and deletions of the files which have the same file path, comprising:

identifying, for each matching sequence, a first sequence of operations followed by a second sequence of operations wherein the first sequence of operations comprises one or more additions no intervening deletions, and wherein the second sequence of operations comprises one or more deletions no intervening additions, and ending the matching sequence at a first addition occurring after the second sequence or at a final modification in the time-ordered sequence of modifications; and computing a value for a contribution metric, that excludes churn credit for the developer entity associated with saving and deleting a file to a same file path, the value being based on one or more file modification operations other than the one or more additions and one or more deletions and that at least excludes the one or more additions and one or more deletions from the computed value for the contribution metric in any of the identified matching sequence of additions and deletions for the files having the same file path.

2. The system of claim 1, wherein the computing of the value further includes discounting portions of the contribution metric by disregarding portions of the contribution metric resulting from additions and deletions in any of the identified matching sequences of additions and deletions.

3. The system of claim 1, wherein the computing of the value further includes discounting portions of the contribution metric by scaling portions of the metric resulting from additions and deletions in any of the identified matching sequences of additions and deletions.

4. The system of claim 3, wherein a particular matching sequence of additions and deletions has one or more intervening modifications to a file having the file path, and wherein computing the value for the contribution metric for the developer entity further comprises counting portions of the metric resulting from the intervening modifications to the file.

5. The system of claim 1, wherein a particular matching sequence comprises one addition and multiple deletions, and wherein computing the value for the contribution metric further comprises discounting the addition and all of the multiple deletions.

6. The system of claim 1, wherein a particular matching sequence comprises multiple additions and one deletion, and wherein computing the value for the contribution metric further comprises discounting all of the additions and the one deletion.

7. The system of claim 1, wherein a particular matching sequence comprises a first number of additions and a different second number of deletions, and wherein computing the value for the contribution metric comprises further discounting all of the first number of additions and all of the second number of deletions.

8. The system of claim 1, wherein the contribution metric includes churn credit associated with at least one of added lines of code, deleted lines of code, added violations, deleted violations, net lines of code added, or net new violations.

9. A computer-implemented method comprising:

receiving a request to compute a value of a contribution metric for modifications to a plurality of snapshots of a software project committed by a developer entity, wherein the developer entity comprises one or more source code developers;

identifying, from the plurality of snapshots, a time-ordered sequence of modifications to files having a same file path in the project, the modifications being attributed to the developer entity;

identifying, in the time-ordered sequence, one or more matching sequences of additions and deletions of the files which have the same file path, comprising:

identifying, for each matching sequence, a first sequence of operations followed by a second sequence of operations wherein the first sequence of operations comprises one or more additions no intervening deletions, and wherein the second sequence of operations comprises one or more deletions no intervening additions, the one or more additions comprising new file save operations and the one or more deletions comprising file delete operations; and ending the matching sequence at a first addition occurring after the second sequence or at a final modification in the time-ordered sequence of modifications; and computing a value for a contribution metric, that excludes churn credit for the developer entity associated with saving and deleting a file to a same file path, including discounting portions of the metric resulting from additions and deletions in any of the identified matching sequence of additions and deletions for the files having the same file path, the value being computed by at least including a valuation of an intervening modification in the time-ordered sequence of modifications comprising a file change operation other than a new file addition or a file deletion.

10. The method of claim 9, wherein the computing of the value further includes discounting portions of the contribution metric by disregarding portions of the contribution metric resulting from additions and deletions in any of the identified matching sequences of additions and deletions.

11. The method of claim 9, wherein the computing of the value further includes discounting portions of the contribution metric by scaling portions of the metric resulting from additions and deletions in any of the identified matching sequences of additions and deletions.

12. The method of claim 11, wherein a particular matching sequence of additions and deletions has one or more intervening modifications to a file having the file path, and wherein computing the value for the contribution metric for the developer entity further comprises counting portions of the metric resulting from the intervening modifications to the file.

13. The method of claim 9, wherein a particular matching sequence comprises one addition and multiple deletions, and wherein computing the value for the contribution metric further comprises discounting the addition and all of the multiple deletions.

14. The method of claim 9, wherein a particular matching sequence comprises multiple additions and one deletion, and wherein computing the value for the contribution metric further comprises discounting all of the additions and the one deletion.

15. The method of claim 9, wherein a particular matching sequence comprises a first number of additions and a different second number of deletions, and wherein computing the value for the contribution metric further comprises discounting all of the first number of additions and all of the second number of deletions.

16. The method of claim 9, wherein the contribution metric includes churn credit associated with at least one of added lines of code, deleted lines of code, added violations, deleted violations, net lines of code added, or net new violations.

17. A computer program product, encoded on one or more hardware storage device, comprising instructions that are executable by one or more computers to cause the one or more computers to perform operations comprising:
receiving a request to compute a value of a contribution metric for modifications to a plurality of snapshots of a software project committed by a developer entity, wherein the developer entity comprises one or more source code developers;
identifying, from the plurality of snapshots, a time-ordered sequence of modifications to files having a same file path in the project, the modifications being attributed to the developer entity;
identifying, in the time-ordered sequence, one or more matching sequences of additions and deletions of the files which have the same file path, the additions comprising new file save operations and the deletions comprising corresponding file deletion operations, the identifying comprising:
identifying, for each matching sequence, a first sequence of operations followed by a second sequence of operations wherein the first sequence of operations comprises one or more additions no intervening deletions, and wherein the second sequence of operations comprises one or more deletions no intervening additions, and
ending the matching sequence at a first addition occurring after the second sequence or at a final modification in the time-ordered sequence of modifications; and
computing a value for a contribution metric, that excludes churn credit for the developer entity associated with saving and deleting a file to a same file path, including discounting portions of the metric resulting from additions and deletions in any of the identified matching sequence of additions and deletions for the files having the same file path.

18. The computer program product of claim 17, wherein the computing of the value further includes discounting portions of the contribution metric by scaling portions of the metric resulting from additions and deletions in any of the identified matching sequences of additions and deletions.

19. The computer program product of claim 17, wherein the computing of the value further includes discounting portions of the contribution metric by scaling portions of the metric resulting from additions and deletions in any of the identified matching sequences of additions and deletions.

20. The computer program product of claim 19, wherein a particular matching sequence of additions and deletions has one or more intervening modifications to a file having the file path, and
wherein computing the value for the contribution metric for the developer entity further comprises counting portions of the metric resulting from the intervening modifications to the file.

* * * * *